United States Patent Office 2,891,059
Patented June 16, 1959

2,891,059
THIOPHOSPHORIC ACID ESTERS AND THEIR PRODUCTION

Hugo Malz, Leverkusen-Wiesdorf, Otto Bayer, Leverkusen-Bayerwerk, Helmut Freytag, Koln-Stammheim, and Friedrich Lober, Leverkusen-Bayerwerk, Germany, assignors to Farbenfabriken Bayer Aktiengesellschaft, Leverkusen, Germany, a corporation of Germany No Drawing. Application March 19, 1958
Serial No. 722,382

Claims priority, application Germany April 1, 1957

13 Claims. (Cl. 260—247.1)

The present invention relates to and has as its objects thiophosphoric acid esters and a method of their preparation. Generally the new esters of the present invention may be represented by the following formula

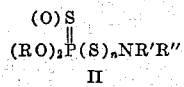

wherein $n$ stands for 1 or 2, R or R' denote hydrocarbon radicals and R" denotes hydrocarbon radicals or hydrogen, i.e. compounds whose common characteristic are the groupings

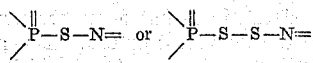

R' and R" may be the same or different and may also be members of a heterocyclic ring system.

The reaction of diesters of thiol- or thionothiolphosphoric acids or their salts with compounds containing reactive halogen attached to carbon is well known in the literature. In this way, triesters of the general formula

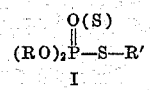

wherein R and R' are hydrocarbon radicals, are obtainable.

It has now been found that the aforesaid diesters of thiol- or thionothiolphosphoric acid or their salts may also be reacted with N-haloamines and aminesulfene halides thus chiefly obtaining in a very smooth reaction compounds of the above said Formula II.

These reactions may be shown by the following schemes:

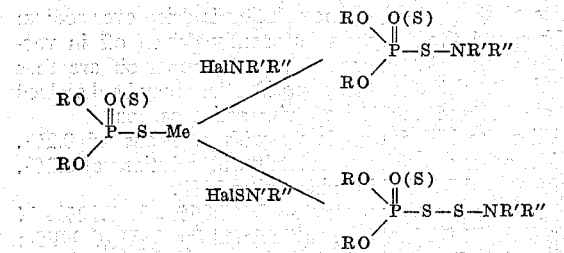

In these formulae the symbols have the same significance as given above. More specifically R in the above said formulae may be a lower alkyl, cycloalkyl or phenyl radical, whereas R' if hydrocarbon and R" additionally may form together with N a piperidine, piperazine, morpholine, pyrolidine ring system, and the like. Me preferably stands for an alkali or ammonium radical, and Hal preferably stands for chlorine or bromine.

The reaction according to the invention can be effected in a homogeneous as well as in a heterogeneous phase. In general, the reaction conditions are dependent on the sensitivity of the halogen compounds used. The N-chloramines which are stable to water may be reacted, for example dissolved in acetone, with aqueous solutions of salts of the diesters of thionothiolphosphoric acid, whilst the aminesulfene chlorides which are generally sensitive to hydrolysis are reacted with suspensions of the corresponding salts in inert anhydrous diluents.

The diesters of thiol- or thionothiolphosphoric acid or their salts, N-haloamines and aminesulfene halides which are used as starting materials are readily obtainable according to known processes.

The new phosphoric acid esters are intended to be used as pest control agents as well as in the rubber industry.

The new compounds of the present invention very effectively kill insects like flies, mites, aphids, etc. They distinguish themselves especially by a good contact-insecticidal activity and sometimes by an activity on eating insects such as caterpillars. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers) alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the compounds of the following formulae

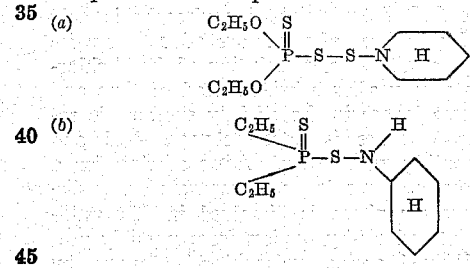

have been tested against flies (Drosophila) and spider mites (*Tetranychus telarius* resist. form). Aqueous solutions have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration.

The tests have been carried out as follows:

(A) Against flies (Drosophila). In Petri dishes of about 5 inches diameter filter paper has been placed, which has been wetted with aqueous solutions of the above shown active ingredients prepared as indicated above. About 30 flies have been placed under the covered Petri dishes and the living status has been determined after 24 hours. The following killing rate has been obtained:

(*a*) Solutions of 0.02% kill flies (Drosophila) 100%.
(*b*) Solutions of 0.2% kill flies (Drosophila) 100%.

(B) Against spider mites (*Tetranychus telarius* resist. form). Bean plant (*Phaseolus vulgaris*) of about 15 inches height are spread drip wet with 0.1% solutions prepared as indicated above. The bean plants have been infested heavily with the two-spotted spider (species *Tetranychus telarius*). Evaluation has been carried out after 24 hours, 48 hours and 8 days. The total percentage of killed pests is as follows:

(a) Solutions of 0.2% kill spider mites 100%
  Solutions of 0.02% kill spider mites 95%
(b) Solutions of 0.2% kill spider mites 100%
  Solutions of 0.02% kill spider mites 90%.

The following examples are given by way of illustration only without, however, limiting the present invention thereto.

Example 1

66.8 grams of N-chloro-cyclohexylamine are dissolved in about 100 millilitres of acetone and then treated with about 100 millilitres of water. 104 grams of the sodium salt of O.O-diethyl-thiol-thionophosphoric acid dissolved in about 200 millilitres of water are added dropwise with stirring to this solution. In a moderately exothermic reaction the reaction mixture separates in two layers, the aqueous layer being discarded after further stirring for about 1 hour. The organic phase is taken up in 150 millilitres of ether, washed with about 200 millilitres of water and dried over sodium sulfate. The ether is subsequently distilled off. The residual slightly brownish somewhat viscous liquid is the cyclohexyl sulfene amide of O.O-diethyl-thiol-thionophosphoric acid of the formula

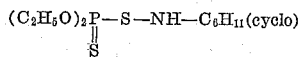

Yield about 80% of the theoretical.
Flies (Drosophila) are killed completely with solutions of 0.2%. Spider mites are killed completely with solution of 0.2%. Solutions of 0.02% kill spider mites 90%.
Analysis (crude product).—C 43.00%, H 7.82%, N 4.72%, P 11.1%, S 22.8%. Calculated for $C_{10}H_{22}O_2NPS_2$: C 42.38%, H 7.82%, N 4.94%, P 10.93%, S 22.68%.

Example 2

110 grams of N-chloro dicyclohexyl amine are dissolved in 200 millilitres of acetone. 104 grams of the sodium salt of O.O-diethyl-thiol-thionophosphoric acid dissolved in 200 millilitres of water are added dropwise with stirring. The initially clear solution of the N-chloramine becomes cloudy after a brief period of time and separates into two layers in the slightly exothermic reaction. The temperature is kept between +15 and +35° C. by cooling with water. After stirring for a further hour, the aqueous layer is separated and discarded. The organic phase is dissolved in 250 millilitres of ether, filtered off by suction from possibly precipitated dicyclohexyl amine hydrochloride formed by side reactions, and then washed with 250 millilitres of water. After drying over sodium sulfate, the solvent is distilled off and the brownish yellow greasy residue thus obtained is recrystallized from hot alcohol. A white crystalline compound is obtained of M.P. 70-71° C. which, according to analysis, is the dicyclohexyl sulfene amide of O.O-diethyl-thiol-thionophosphoric acid.
Solutions of 0.2% kill flies (Drosophila) 60%.
Analysis (from alcohol).—C 53.08%, H 8.78%, N 3.90%, P 8.5%, S 17.4%. Calculated for $C_{16}H_{32}O_2NPS_2$: C 52.57%, H 8.82%, N 3.83%, P 8.47%, S 17.54%.

Example 3

In a manner similar to that described in Examples 1 and 2, the sodium salt of O.O-diethyl-thio-thionophosphoric acids is suspended in alcohol and reacted with equivalent quantities of N-chloropiperidine dissolved in alcohol. After suction-filtration of the precipitated sodium chloride the alcoholic solution is concentrated until the solvent is completely removed. The residual brown oil is taken up in ether and washed with water. After drying over sodium sulfate, the ether is evaporated, the piperidyl sulfene amide of O.O-diethyl-thiol-thionophosphoric acid remaining as a clear yellow oil.
Analysis (crude product).—C 40.00%, H 7.55%, N 5.40%, P 11.35%, S 23.0%. Calculated for $C_9H_{20}O_2NPS_2$: C 40.09%, H 7.48%, N 5.20%, P 11.50%, S 23.81%.

Example 4

70 grams of the potassium salt of O.O-diisobutyl-thiol-thionophosphoric acid are dissolved in about 150 millilitres of water and added dropwise to a solution of 54 grams of N-chloro-dicyclohexyl amine in 150 millilitres of acetone. The temperature of the reaction mixture rises rapidly and is maintained between about 25 and 35° C. by cooling. After a short time the reaction mixture becomes cloudy and separates into two phases. The whole reaction mixture is shaken with 250 millilitres of chloroform and filtered off by suction from the possibly precipitated dicyclohexyl amine hydrochloride formed by side reactions. The aqueous layer is discarded, the chloroform layer dried over sodium sulfate and the solvent is distilled off in vacuum. A reddish brown oil is obtained as residue having an aromatic odor which is the dicyclohexyl sulfene amide of O.O-diisobutyl-thiol-thionophosphoric acid. Yield about 80 grams corresponding to about 76% of the theoretical.
Analysis (crude product).—P 7.1%. Calculated for $C_{20}H_{40}O_2NPS_2$: P 7.36%.

Example 5

70.5 grams of O.O-diphenyl-thiol-thionophosphoric acid are neutralized with a solution of 10 grams of sodium hydroxide in about 150 millilitres of water. This solution is subsequently added dropwise to a solution of 54 grams of N-chlorodicyclohexyl amine in about 150 millilitres of acetone. By cooling with ice the exothermic reaction is moderated so that a temperature of 15-25° C. prevails in the reaction mixture. The reaction mixture separates into an aqueous layer which is discarded, and a resinous deposit which is dissolved in chloroform and washed with water. After drying over sodium sulfate, the solvent is evaporated, and the resultant brown and greasy residue shaken with ether, a white crystalline compound remaining undissolved having a M.P. 128-130° C.
Analysis (crude product).—P 6.3%, 7.0%; S 13.7%, S 12.9%. Calculated for $C_{24}H_{32}O_2NPS_2$: P 6.7%, S 12.9%.

Example 6

A solution of 48.4 grams of N-cyclohexyl-N-ethyl-amine sulfene chloride in 200 millilitres of benzene is added dropwise with stirring to a suspension of 52 grams of the sodium salt of O.O-diethyl-thiol-thionophosphoric acid in 250 millilitres of benzene. The temperature of the reaction mixture rises to about 30-35° C. After stirring for a further hour, the reaction mixture is thoroughly shaken with 250 millilitres of water, the organic layer is separated, washed again with about 100 millilitres of water, the benzene solution is dried over sodium sulfate and the solvent subsequently driven off in vacuum. About 70 grams of a dark brown oil are thus obtained which, for further purification, may be dissolved in alcohol and decolorized with active carbon.
Flies are killed completely with solutions of 0.2%. Spider mites are killed completely with solutions of 0.2%. Solutions of 0.02% kill spider mites 90%.
Analysis (crude product).—C 40.86%, H 7.10%, N 4.09%, P 9.2%, S 28.8%. Calculated for $C_{12}H_{26}O_2NPS_3$: C 41.96%, H 7.63%, N 4.08%, P 9.02%, S 28.01%.
The isolated product is thus O.O-diethyl-thiol-thiono-N-cyclohexyl-N-ethyl-amino disulfide having the formula

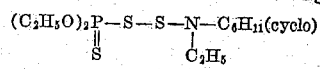

Example 7

In a similar manner to that described in Example 6, 49 grams of diisobutyl amine sulfene chloride are dissolved in benzene and reacted with a suspension of 52 grams of the sodium salt of O.O-diethyl-thiol-thionophosphoric acid in benzene. When the slightly exothermic reaction has subsided, the precipitated sodium chloride is removed by washing with water as described in Example 6. The benzene solution, dried over sodium sulfate, is freed in vacuum from the solvent thus yielding about 65–70 grams of a dark brown clear oil which is O.O-diethyl-thiol-thionophosphoric acid-N-diisobutyl-amino-disulfide.

Flies (Drosophila) are killed completely with solutions of 0.2%. Solutions of 0.2% kill spider mites 80%.

Analysis (crude product).—C 41.95%, H 8.12%, N 4.13%, P 8.8%, S 28.0%. Calculated for $C_{12}H_{28}O_2NPS_3$: C 41.71%, H 8.17%, N 4.05%, P 8.96%, S 27.84%.

*Example 8*

In a manner similar to that described in the preceding example, there may be obtained by reaction of diethyl amine sulfene chloride with the sodium salt of O.O-diethyl-thiol-thionophosphoric acid a slightly yellowish brown, somewhat viscous and clear liquid in 75–80% yield which represents O.O-diethyl-thiol-thionophosphoric acid-N-diethyl-amino-disulfide.

Flies (Drosophila) are killed completely with solutions of 0.2%. Spider mites are killed completely with solutions of 0.2%. Solutions of 0.02% kill spider mites 50%.

Analysis (crude product).—C 32.63%, H 6.48%, N 4.72%, P 10.65%, S 33.9%. Calculated for $C_8H_{20}O_2NPS_3$: C 33.20%, H 6.97%, N 4.84%, P 10.70%, S 33.24%.

*Example 9*

If a benzenic solution of dimethyl-amine sulfene chloride is reacted with the sodium salt of O.O-diethyl-thiol-thionophosphoric acid in a manner similar to that described in the preceding examples, there is obtained a greenish yellow thinly liquid oil in 90% yield which can be distilled under the vacuum of an oil pump without decomposition. The distillate going over at 118° C. under a vacuum of 0.08 mm. Hg is a clear slightly yellowish green liquid.

Flies are killed completely with solutions of 0.2%. Spider mites are also killed completely with solutions of 0.2%, solutions of 0.02% kill spider mites 95%.

Analysis (distillate).—C 27.82%, H 6.06, N 5.63%, P 11.35%, S 37.55%. Calculated for $C_6H_{16}O_2NPS_3$: C 27.57%, H 6.17%, N 5.36%, P 11.85%, S 36.81%.

*Example 10*

According to the instructions given in the preceding examples, there is obtained from piperidyl-N-sulfene chloride and the sodium salt of O.O-diethyl-thiol-thionophosphoric acid the O.O-diethyl-thiol-thionophosphoric acid piperidyl-disulfide as a clear brown oil in about 90% yield.

If instead of the piperidyl-N-sulfene chloride there is used in the reaction the morpholyl-N-sulfene chloride, the O.O-diethyl-thiol-thionophosphoric acid morpholine disulfide is obtained as a clear yellow oil.

The oils, after washing with water according to the instructions given in the preceding examples and after removal of possibly precipitated impurities, are analytically pure and may be used without further purification.

Flies (Drosophila) are killed completely with solutions of 0.02%. Spider mites are killed completely with solutions of 0.2%, and solutions of 0.02% kill spider mites 95%.

We claim:

1. Thiophosphoric acid esters of the general formula

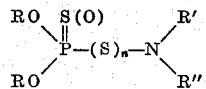

wherein R and R' stand for a member selected from the group consisting of lower alkyl, cycloalkyl and phenyl radicals, and R" stands for a member selected from the group consisting of hydrogen and lower alkyl, cycloalkyl and phenyl radicals, n being a member selected from the group consisting of 1 and 2.

2. The cyclohexyl sulfene amide of O.O-diethyl-thiol-thionophosphoric acid of the formula

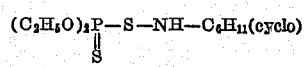

3. The dicyclohexyl sulfene amide of O.O-diethyl-thiol-thionophosphoric acid.

4. The piperidyl sulfene amide of O.O-diethyl-thiol-thionophosphoric acid.

5. The dicyclo hexyl sulfene amide of O.O-diisobutyl-thiol-thionophosphoric acid.

6. The dicyclo hexyl sulfene amide of O.O-diphenyl-thiol-thionophosphoric acid.

7. The O.O-diethyl-thiol-thiono-N-cyclohexyl-N-ethyl-amino disulfide of the formula

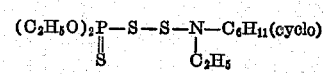

8. The O.O-diethyl-thiol-thionophosphoric acid-N-diisobutyl-amino-disulfide.

9. The O.O-diethyl-thiol-thionophosphoric acid-N-di-amino-disulfide.

10. The O.O-diethyl-thiol-thionophosphoric acid-N-dimethylamino-disulfide.

11. The O.O-diethyl-thiol-thionophosphoric acid piperidyldisulfide.

12. The O.O-diethyl-thiol-thionophosphoric acid morpholine-disulfide.

13. The process for the preparation of phosphoric acid ester which comprises reacting a member selected from the group consisting of O.O-thiol-(and thionothiol-)-phosphoric acid salts, with a member selected from the group consisting of N-haloamines and amine sulfene halides.

No references cited.

UNITED STATES PATENT OFFICE
Certificate of Correction

Patent No. 2,891,059　　　　　　　　　　　　　　　　　　　　　　　June 16, 1959

Hugo Malz et al.

It is hereby certified that error appears in the printed specification of the above numbered patent requiring correction and that the said Letters Patent should read as corrected below.

Column 1, lines 51 to 61, the formula should appear as shown below instead of as in the patent:

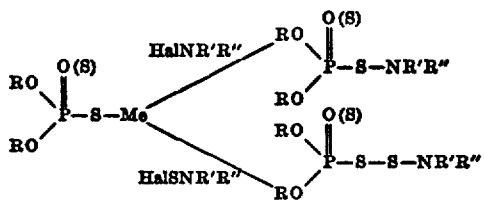

column 2, lines 39 to 45, the formula should appear as shown below instead of as in the patent:

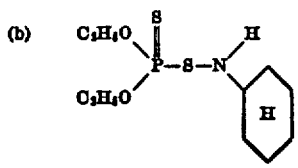

Signed and sealed this 19th day of January 1960.

[SEAL]

Attest:
KARL H. AXLINE,
*Attesting Officer.*

ROBERT C. WATSON,
*Commissioner of Patents.*